(12) United States Patent
Aravamudan et al.

(10) Patent No.: US 10,978,094 B2
(45) Date of Patent: *Apr. 13, 2021

(54) METHOD OF AND SYSTEM FOR REAL TIME FEEDBACK IN AN INCREMENTAL SPEECH INPUT INTERFACE

(71) Applicant: Veveo, Inc., Andover, MA (US)

(72) Inventors: Murali Aravamudan, Andover, MA (US); Girish Welling, Nashua, NH (US); Daren Gill, Concord, MA (US); Sankar Ardhanari, Windham, NH (US); Rakesh Barve, Bangalore (IN); Sashikumar Venkataraman, Andover, MA (US)

(73) Assignee: Veveo, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,280

(22) Filed: Oct. 18, 2018

(65) Prior Publication Data

US 2019/0051317 A1 Feb. 14, 2019

Related U.S. Application Data

(63) Continuation of application No. 14/271,869, filed on May 7, 2014, now Pat. No. 10,121,493.

(Continued)

(51) Int. Cl.
*G10L 25/54* (2013.01)
*G06F 16/245* (2019.01)
(Continued)

(52) U.S. Cl.
CPC ............ *G10L 25/54* (2013.01); *G06F 16/245* (2019.01); *G06F 16/433* (2019.01); *G10L 15/22* (2013.01)

(58) Field of Classification Search
CPC ......... G06F 17/30994; G06F 17/30554; G06F 17/30026; G06F 17/30424; G06F 16/2455;
(Continued)

(56) References Cited

U.S. PATENT DOCUMENTS 4,509,133 A * 4/1985 Monbaron .............. G10L 15/22
704/251
6,064,960 A * 5/2000 Bellegarda .............. G10L 13/10
704/260

(Continued)

FOREIGN PATENT DOCUMENTS

JP H06266779 9/1994
JP H09146972 6/1997
(Continued)

OTHER PUBLICATIONS

Brazilian Patent Application BR112015001363-5, filed Jul. 19, 2013, Preliminary Office Action dated Aug. 4, 2020.
(Continued)

*Primary Examiner* — Irete F Ehichioya
*Assistant Examiner* — Huen Wong
(74) *Attorney, Agent, or Firm* — Haley Guiliano LLP

(57) ABSTRACT

The present disclosure provides systems and methods for selecting and presenting content items based on user input. The method includes receiving first input intended to identify a desired content item among content items associated with metadata, determining that an input portion has an importance measure exceeding a threshold, and providing feedback identifying the input portion. The method further includes receiving second input, and inferring user intent to alter or supplement the first input with the second input. The method further includes, upon inferring intent to alter the first input, determining an alternative query by modifying (Continued)

the first input based on the second input, and, upon inferring intent to supplement the first input, determining an alternative query by combining the first input and the second input. The method further includes selecting and presenting a subset of content items based on comparing the alternative query and metadata associated with the subset.

20 Claims, 10 Drawing Sheets

Related U.S. Application Data

(60) Provisional application No. 61/820,267, filed on May 7, 2013.

(51) Int. Cl.
*G06F 16/432* (2019.01)
*G10L 15/22* (2006.01)

(58) Field of Classification Search
CPC .... G06F 16/248; G06F 16/245; G06F 16/433; G10L 25/54; G10L 15/22
See application file for complete search history.

(56) References Cited

U.S. PATENT DOCUMENTS

| | | | |
|---|---|---|---|
| 6,195,635 B1* | 2/2001 | Wright | G10L 15/08 704/231 |
| 6,256,664 B1 | 7/2001 | Donoho | |
| 6,408,293 B1 | 6/2002 | Aggarwal | |
| 8,880,423 B2 | 11/2014 | Zhang | |
| 9,542,482 B1 | 1/2017 | Sachan | |
| 10,341,447 B2 | 7/2019 | Kelly | |
| 2002/0065884 A1 | 5/2002 | Donoho | |
| 2003/0101047 A1 | 5/2003 | Panttaja | |
| 2003/0216912 A1* | 11/2003 | Chino | G10L 15/22 704/231 |
| 2004/0019588 A1* | 1/2004 | Doganata | G06F 16/3338 |
| 2005/0034079 A1 | 2/2005 | Gunasekar | |
| 2006/0074661 A1* | 4/2006 | Takaichi | G10L 15/22 704/252 |
| 2006/0074870 A1 | 4/2006 | Brill | |
| 2007/0073540 A1* | 3/2007 | Hirakawa | G10L 15/22 704/252 |
| 2007/0192101 A1* | 8/2007 | Braho | G10L 15/065 704/251 |
| 2007/0225980 A1* | 9/2007 | Sumita | G10L 15/1815 704/240 |
| 2008/0010352 A1 | 1/2008 | Donoho | |
| 2008/0155701 A1 | 6/2008 | Marinez | |
| 2008/0221866 A1 | 9/2008 | Katragadda | |
| 2009/0144609 A1 | 6/2009 | Liang et al. | |
| 2009/0276396 A1 | 11/2009 | Gorman | |
| 2009/0281923 A1 | 11/2009 | Selinger | |
| 2010/0153885 A1 | 6/2010 | Yates | |
| 2011/0119282 A1 | 5/2011 | Gorman | |
| 2011/0179440 A1 | 7/2011 | Safaipour | |
| 2012/0124071 A1 | 5/2012 | Gebhard | |
| 2013/0297285 A1* | 11/2013 | Kwon | G06F 17/2863 704/2 |
| 2014/0297666 A1 | 10/2014 | Morris | |
| 2018/0225013 A1 | 8/2018 | Barrett | |
| 2018/0308202 A1 | 10/2018 | Appu | |
| 2018/0349755 A1 | 12/2018 | Gao | |
| 2019/0108447 A1 | 4/2019 | Kounavis | |
| 2019/0179861 A1 | 6/2019 | Goldenstein | |
| 2019/0197357 A1 | 6/2019 | Anderson | |
| 2019/0295211 A1 | 9/2019 | Appu | |
| 2019/0335007 A1 | 10/2019 | Kelly | |

FOREIGN PATENT DOCUMENTS

| | | |
|---|---|---|
| JP | 2001-034292 | 2/2001 |
| JP | 2001-100787 | 4/2001 |
| JP | 2001-175680 | 6/2001 |
| JP | 2002108915 | 4/2002 |
| JP | 2003-058538 | 2/2003 |
| JP | 2006-107469 | 4/2006 |
| JP | 2007511016 | 4/2007 |
| JP | 2008-243047 | 10/2008 |
| JP | 2009-037603 | 2/2009 |
| JP | 2010-205265 | 9/2010 |
| WO | WO1998013771 | 4/1998 |
| WO | WO2007103938 | 9/2007 |

OTHER PUBLICATIONS

Anonymous: "Speech recognition—Wikipedia", Jan. 31, 2012, (Jan. 31, 2012), XP055700274, Retrieved from the Internet: URL:https://en.wikipedia.org/w/index.php?.

* cited by examiner

METHOD OF AND SYSTEM FOR REAL TIME FEEDBACK IN AN INCREMENTAL SPEECH INPUT INTERFACE

CROSS-REFERENCE TO RELATED APPLICATIONS

This application is a continuation of U.S. application Ser. No. 14/271,869, filed May 7, 2014 (allowed), which claims the benefit of U.S. Provisional Patent Application No. 61/820,267, filed May 7, 2013. The entire contents of which are incorporated by reference herein in their entireties.

This application is related to the following applications: U.S. patent application Ser. No. 13/801,958, entitled "Method for Adaptive Conversation State Management with Filtering Operators Applied Dynamically as part of a Conversational Interface," and filed Mar. 13, 2013. U.S. patent application Ser. No. 13/801,958 claims the benefit under 35 U.S.C. § 119(e) to U.S. Provisional Patent Application No. 61/712,720, entitled "Method for Adaptive Conversation State Management Filtering Operators Applied Dynamically as Part of a Conversation Interface," filed Oct. 11, 2012; and U.S. patent application Ser. No. 13/801,837, entitled "Method for Using Pauses Detected In Speech Input to Assist in Interpreting the Input During Conversational Interaction for Information Retrieval," and filed Mar. 13, 2013. U.S. patent application Ser. No. 13/801,837 claims the benefit under 35 U.S.C. § 119(e) to U.S. Provisional Patent Application No. 61/679,184, entitled "Method for Using Pauses Detected in Speech Input to Assist in Interpreting the Input During Conversational Interaction for Information Retrieval," filed Aug. 3, 2012.

The entire contents of all applications described above are incorporated by reference herein.

FIELD OF THE DISCLOSURE

The present disclosure relates to systems and methods for assisting a user in retrieving information using incremental input to a conversational interface, and, more specifically, related to techniques of providing interactive feedback to a user during incremental input to a conversational interface.

BACKGROUND OF THE DISCLOSURE

Content discovery based on speech input is at a similar stage of evolution compared to text-based input interfaces almost a decade ago. A user expresses intent using a fully formed spoken sentence, and then waits for a response. The response may then trigger the user to follow up with another full sentence. Analogous to this usage model, almost a decade ago the user expressed his or her entire intent in the form of fully formed keywords, and then submitted the fully entered search query. Text-based incremental search changed this operational paradigm. Text-based incremental search is described further in U.S. Pat. No. 7,895,218, entitled "Method and system for performing searches for television content using reduced text input" and filed May 24, 2005, the entire contents of which are incorporated by reference herein. In text-based incremental search, search results appear as the user types keywords (or even mere prefixes corresponding to keywords). Users now take for granted the ease of use of a text-based incremental search interface.

Speech-based content discovery systems are becoming reliable and useful enough to be incorporated into users' daily lives. While users have been conditioned by the ease of use of text-based incremental search, speech-based content discovery is also ushering in a slow change in intent expression. For example, speech-based content discovery provides an ability to speak users' minds directly, as opposed to translating thought into a string of keywords. While natural-language-based speech interfaces are primarily in the mobile and television environment, the desktop environment is also seeing the emergence of natural language interfaces, such as Facebook Graph search, where user types in a natural language query.

SUMMARY

The present disclosure includes methods and systems for selecting and presenting content items based on user input. The present disclosure provides an incremental input interface for information retrieval. The present systems and methods provide feedback of the system's interpretation of user input, and return responses based on that interpretation.

Some embodiments include computer-implemented methods for selecting and presenting content items based on user input. The methods include providing access to a set of content items, the content items being associated with metadata that describes a corresponding content item. The methods further include receiving a first input intended by the user to identify at least one desired content item, determining that at least a portion of the first input has a measure of importance that exceeds a threshold value, and providing feedback to the user identifying the portion of the input. The methods further include receiving second input from the user that is subsequent to the first input, and inferring whether the user intended to alter the first input with the second input or supplement the first input with the second input. The methods further include, upon the condition in which it is inferred that the user intended to alter the first input with the second input, determining an alternative query input by modifying the first input based on the second input. The methods further include, upon the condition in which it is inferred that the user intended to supplement the first input with the second input, determining an alternative query input by combining the first input and the second input. The methods further include selecting a subset of content items from the set of content items based on comparing the alternative query input and the metadata associated with the subset of content items, and presenting the subset of content items to the user.

Some embodiments include systems for selecting and presenting content items based on user input. The systems include computer readable instructions encoded on a non-transitory computer readable medium. The computer readable instructions cause the computer system to be configured to provide access to a set of content items, the content items being associated with metadata that describes a corresponding content item. The computer-readable instructions further cause the computer system to be configured to receive a first input intended by the user to identify at least one desired content item, determine that at least a portion of the first input has a measure of importance that exceeds a threshold value, and provide feedback to the user identifying the portion of the input. The computer-readable instructions further cause the computer system to be configured to receive second input from the user that is subsequent to the first input, and infer whether the user intended to alter the first input with the second input or supplement the first input with the second input. The computer-readable instructions further cause the computer system to be configured to, upon the condition in which it is inferred that the user intended to alter the first input with the second input, determine an alternative query input by modifying the first input based on the second input. The computer-readable instructions further cause the computer system to be configured to, upon the condition in which it is inferred that the user intended to supplement the first input with the second input, determine an alternative query input by combining the first input and the second input. The computer-readable instructions further cause the computer system to be configured to select a subset of content items from the set of content items based on comparing the alternative query input and the metadata associated with the subset of content items, and present the subset of content items to the user.

The embodiments described herein may include additional aspects. For example, the determining that at least the portion of the first input has the measure of importance that exceeds the threshold value includes identifying one or more phrase boundaries in the incremental input, and the identifying the one or more phrase boundaries is based at least in part on at least one of (a) an identified disfluency from the user in the first input, (b) grammar rules applied to the first input, (c) the importance measure of the portion of the first input, (d) at least one previous conversational interaction with the user, and (e) a user preference signature. The user preference signature may describe preferences of the user for at least one of (i) particular content items and (ii) particular metadata associated with the content items, where the portion of the first input is identified based on the user preference signature. The disfluency may include a pause in speech input, an auditory time filler in speech input, and/or a pause in typing input. The selecting the subset of content items may be based further upon a disfluency identified in the first input, and based further upon prior conversational interactions that are determined to be related to the first input and the second input. The providing the feedback may include requesting clarification on the identified portion of the input, suggesting a completion of the received first input, and/or repeating the portion of the input to the user, so as to notify the user that the portion of the input is potentially incorrectly recognized. The requesting clarification on the identified portion of the input may be based at least in part on a determination that a disfluency occurs after the user has provided the portion of the input. The suggesting the completion of the received first input may be based at least in part on a determination that the disfluency occurs before the user would be expected to provide the portion of the input. The feedback provided to the user may be chosen based on a duration of an identified disfluency in the first input, a measure of confidence in correct speech-to-text recognition of the portion of the input, a count of ambiguities detected in the first input, a count of error corrections needed to identify the portion of the input, a count of nodes in a graph data structure, where the count of the nodes in the graph data structure measures a path between a first node representing an item of interest from a previous conversational interaction and a second node representing the portion of the input, and/or a measure of relatedness of the portion of the input to previous conversational interactions with the user. The presenting the subset of content items may include presenting the subset of content items before receiving completed input from the user, upon a determination of a strong recognition match for the first input and upon a determination that a responsiveness measure of the selected subset of content items would be above a threshold. The inferring whether the user intended to alter the first input with the second input or supplement the first input with the second input may include determining a measure of similarity between the first input and the second input, upon the condition that the similarity measure is above a threshold, inferring that the user intended to alter the first input, and upon the condition that the similarity measure is below a threshold, inferring that the user intended to supplement the first input.

BRIEF DESCRIPTION OF THE DRAWINGS

For a more complete understanding of various embodiments of the present systems and methods, reference is now made to the following descriptions taken in connection with the accompanying drawings, in which like reference numerals refer to like elements.

DETAILED DESCRIPTION OF PREFERRED EMBODIMENTS

Overview

Figure 1:
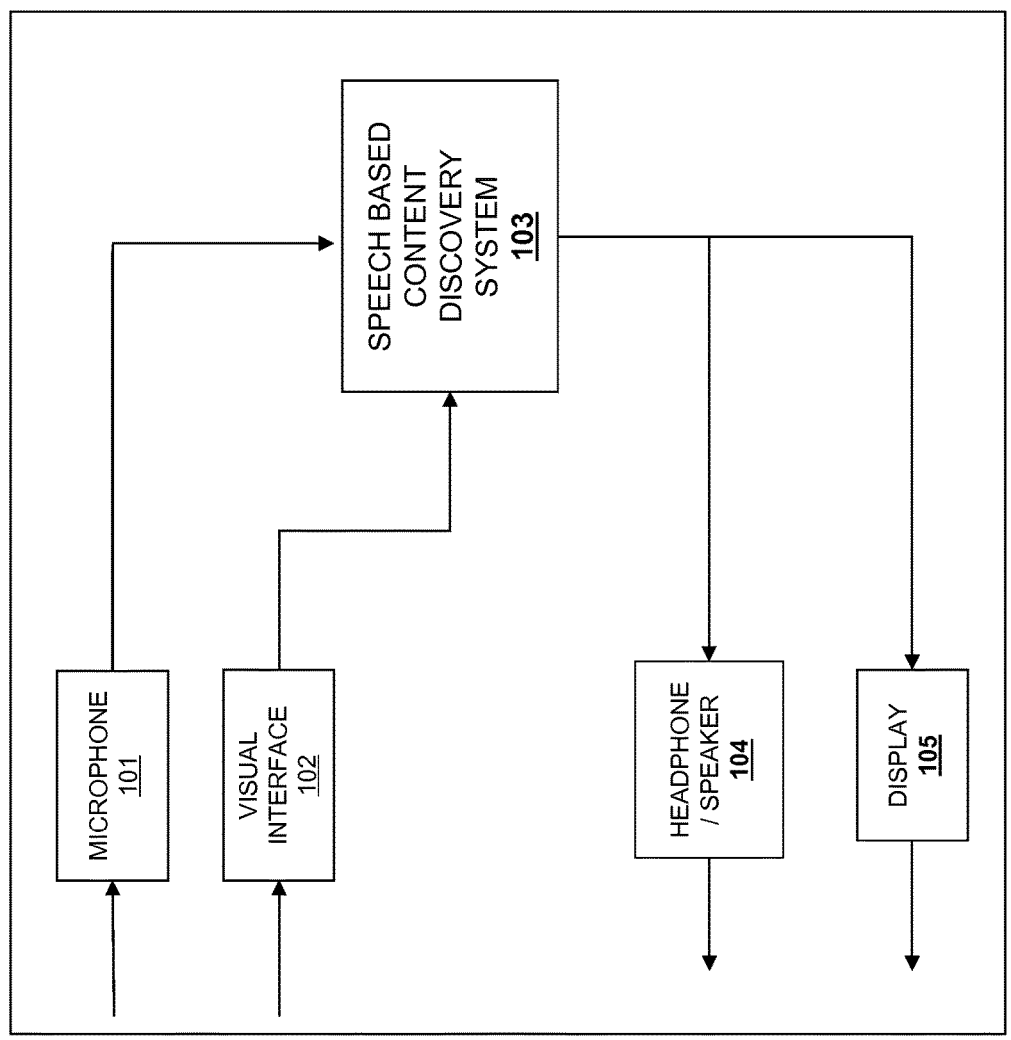
FIG. 1 illustrates input and output components of an example system for incremental input, in accordance with some embodiments.

The present disclosure provides an incremental input interface for information retrieval, in which the present systems and methods provide real time feedback of the system's interpretation of user input and return responses based on that interpretation. Some embodiments include a speech-based incremental input interface, in which the present systems and methods provide real-time feedback on user input as the user speaks. The present methods and systems enable a user experience similar to human interactions in which a listener responds to a query immediately or even before a user finishes a question.

In addition to approaching the natural experience of human interactions, the present systems and methods address deficiencies plaguing traditional conversation-based systems, for example in which errors in speech recognition abound. The feedback provided by the present systems enables the user to know in real time the occurrence of an error, and receive an opportunity to fix the error. The user does not have to start speaking all over again, or resort to a text input interaction mode, to edit a long string text version of spoken input. The use of text input mode is known to be cumbersome and dangerous in a mobile environment, given the exclusive cognitive, motor, and sensory attention demanded by text editing. Example requirements of a text input mode include placing or navigating the insertion point of text into the middle of a sentence string to delete an incorrect phrase or word, and then typing the correct phrase or word. The present methods and systems provide real time feedback on user input at phrase boundaries, and also return full responses or synopses of responses to user input.

Some embodiments provide the responses in both audio and/or visual form, matching how the user is currently using the present system. Just as in the case of human interactions, where pauses in conversations are important cues for gauging comprehension level, confidence, and/or lack of confidence on content that is spoken, the present systems and methods make full use of disfluencies in conversation, within and across sentences, by appropriately interpreting the disfluencies to time auditory/visual feedback and responses to the user. Example disfluencies include pauses in conversation; auditory fillers in conversation such as "um," "hmm," "er," "uh," "eh," "well," or even "like;" or pauses in keyboard input, such as when a user pauses typing. Discovery of the Problem and Advantages of the Solution Applicants have discovered that from an input method perspective, the expression of intent as a fully formed sentence as opposed to a string of keywords, requires that speech interfaces for content discovery not be like "speech command" execution engines. They need to make sense of full sentences to generate responses.

Applicants have also discovered that another challenge that speech based content discovery systems face is the correction of errors that creep into user input due to speech recognition errors. Uttering a full sentence and then having to correct a phrase in the middle of a speech-to-text-converted sentence is not easy, particularly in a mobile environment where the user may be driving and have his or her hands and eyes fully engaged. Even ignoring the cumbersomeness of text editing, the exclusive cognitive, motor, and sensory attention demanded by the editing operation eliminates text editing as an option for correction in mobile environments such as when the user is driving.

Furthermore, Applicants have uncovered that a more subtle challenge to address in a speech-input-based content discovery interface is to parallel the ease of use that text-based incremental search naturally offers. In text based incremental search, as the user types an intent, the results provide instant visual feedback of the system converging on the results. That is, as user types a phrase "java programmer," into a text search input, the user begins to see search results of JAVA programmers, for example in an information retrieval system for recruiting. The subsequent addition of the constraints such as "boston," or "embedded system development," may then be dynamic choices the user can make based on results that appear as the user types. The instant nature of the search response serves two key goals—(1) the response offers instant feedback to the user and (2) the response even helps the user to tailor subsequent questions based on the response—all while just typing into a search box. It is not sufficient for the accuracy rate of speech recognition to improve to parallel the ease of use of text-based incremental search. Even if speech recognition approaches 100% accuracy, the ability of the present systems and methods to dynamically alter the original intent based on responses to partial input is a useful user experience factor for gauging system responsiveness and intelligence. Conversations that many users would classify as engaging are still likely to contain mutual interrupts and interjections. For example, these interruptions and interjections form the essence of conversation richness, even if the conversation stays focused on the main topic of discussion.

Embodiments of the present systems and methods address the challenges outlined above in multiple ways. One method serves to give user the confidence that speech recognition worked both in visual and auditory form. This confirmation may be by an auditory and/or visual response (e.g., via a dashboard of a car or mobile phone display). In auditory form, this confirmation may including repeating back recognized phrases (not all of user utterance), or providing a synopsis of the response, as the user speaks (e.g., the present systems respond with "50 java programmers matched" for search results). The present system may also render full results in visual or auditory form when user pauses—the length of a pause being used as a metric for deciding what results to present.

In summary, the present disclosure describes a speech input based content discovery interface where feedback and responses are presented as the user expresses intent, where the responses may include feedback on user input and results for the intent expressed by user up to that point.

Incremental Input System

Preferred embodiments of the present invention and their advantages may be understood by referring to FIGS. 1-10.

FIG. 1 illustrates input and output components of an example system 103 for incremental input, in accordance with some embodiments. System 103 includes inputs microphone 101 and visual interface 102. System 103 also includes outputs headphone/speaker 104 and display 105

Some embodiments allow the user to express intent by speaking or typing. Microphone 101 and visual interface 102, such as a text box or equivalent, can enable both forms of input. Further embodiments include both forms of input, or only one. Similarly, some embodiments render visual and auditory responses, respectively, on display 105 and headphone/speaker 104. Examples of devices supporting different combinations of these inputs and outputs include tablets (e.g. iPad) having both forms of input and output, mobile phones having both forms of input and output (though in actual use, the user may only use audio inputs and outputs, for example while driving), car dashboard displays having audio input and both visual and auditory output, desktop/tablet computers having both forms of input and output (though the user may only expressly use the visual input and output means).

The latter use case of desktop/tablet computers that support audio and visual input and output may initially appear to be merely a text-based incremental search use case. However, the present systems and methods are still able to use natural language input in combination with an ability to detect terms of importance at phrase boundaries, for facilitating quick editing. For example, visual interfaces on touch based devices make interaction difficult when placing an insertion point for deletion or selection. Even on desktop computers where editing operations are easier, some embodiments make a natural language input interface for text a simple and natural extension of the familiar search text box. For example, the present systems interpret disfluencies, e.g., pauses, detected between a user's typing of sentences to represent sentence boundaries. This use of disfluencies removes the need for the user to type explicit delimiters such as punctuation. Accordingly, in some embodiments system 103 extends the familiar text-based visual interface 102 as a means to enter intent in the present natural language interface. The present system uses disfluencies detected between words and sentences to interpret sentence and conversation boundaries. The present systems become familiar and easy to adopt interfaces, for users who want to use natural language interfaces, or for users already comfortable with keyword-based search refinement. The implicit determination of sentence and conversation boundaries based on disfluencies makes this familiarity possible. Further embodiments use hybrid or combination text and speech modes to allow a user to express intent, if desired.

Figure 2:
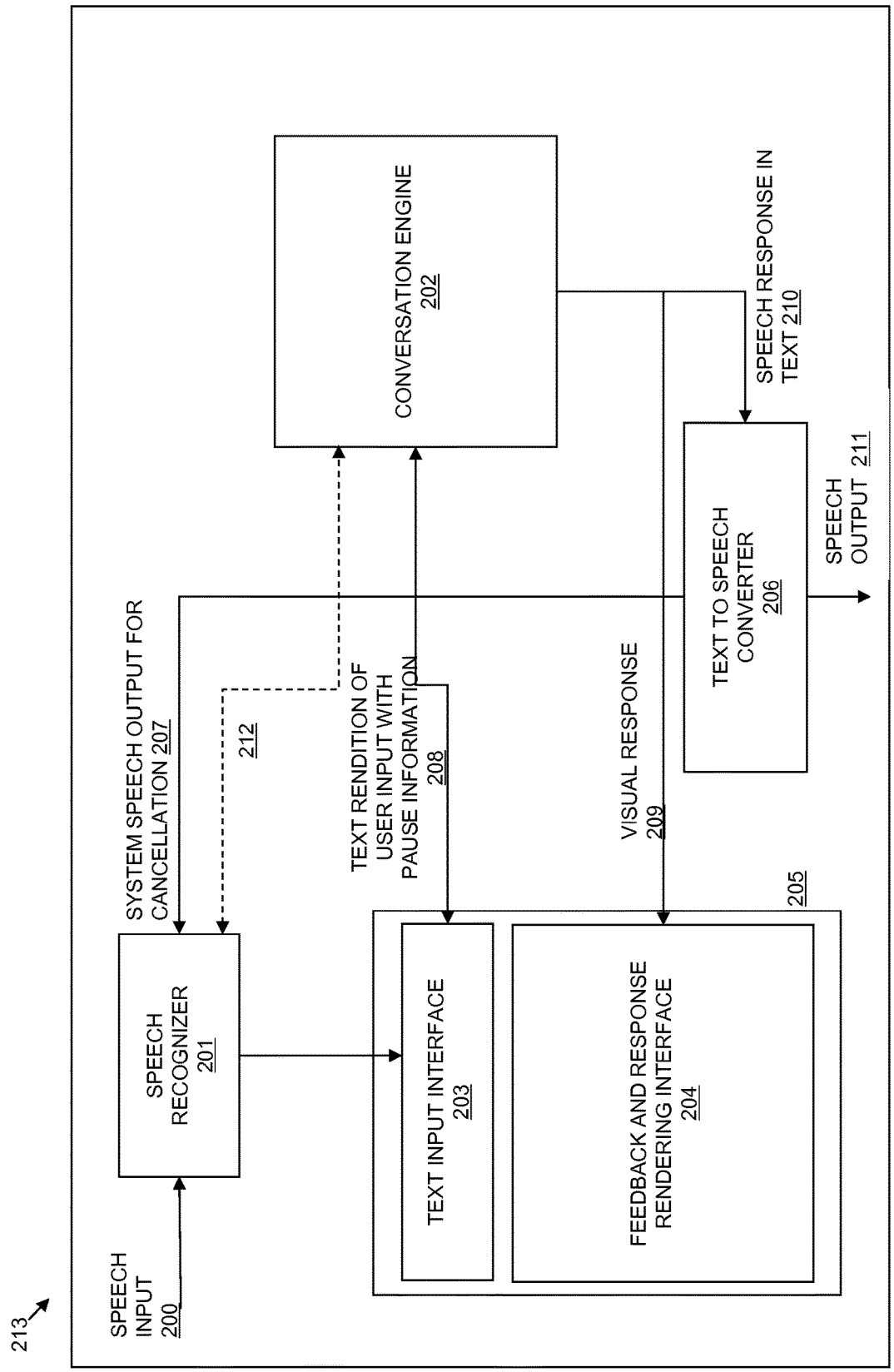
FIG. 2 illustrates an example system for an incremental speech input interface, in accordance with some embodiments.

FIG. 2 illustrates an example system 213 for an incremental speech input interface, in accordance with some embodiments. System 213 includes speech recognizer 201, text input interface 203, feedback and response rendering interface 204, and text-to-speech converter 206.

System 213 feeds speech input stream 200 from the user to speech recognizer 201. Speech recognizer 201 emits recognized text in real time as the user speaks. In some embodiments, display 205 presents the emitted text directly as pre-filled text in text input interface 203. In other embodiments, system 213 sends the recognized text with errors to conversation engine 202 (via input/output interface 212). Conversation engine 202 interprets the recognized output, including embedded errors, in the context of the conversation to perform more intelligent error correction of the user input. Text input interface 203 then displays the recognized output. By using the context of the conversation, some embodiments use previously stored state variables about the present interactions in the conversational context and/or previous conversations (e.g., entities, intents, and/or results from conversational interactions) to improve a prediction of what intent the user was trying to communicate. For example, if a user says a phrase containing a word that speech recognizer 201 could interpret as either "java" or "jabba," system 213 may infer the user was asking about "JAVA," the programming language, based on conversational interactions including earlier requests by the user for a list of programmers available in a designated geographical area. In contrast, system 213 infers the user was not requesting content items relating to "Jabba," the name of a fictional character in the Star Wars movies (i.e., "Jabba the Hut"). The error correction described above and determination of corresponding state variables are disclosed in U.S. patent application Ser. No. 13/801,958, entitled "Method for Adaptive Conversation State Management with Filtering Operators Applied Dynamically as Part of a Conversational Interface," filed Mar. 13, 2013.

In some embodiments, system 213 highlights phrases as interactive elements that are easily editable, based on the present processing of speech input 200 and corresponding text in real time by conversation engine 202 before display on text input interface 203. The present highlighting allows system 213 to handle recognition errors that were not discovered by conversation engine 202. In some embodiments, system 213 uses rules of grammar to identify the appropriate interactive elements for highlighting. For example, system 213 highlights nouns or subjects of a sentence, as identified by a grammar rules engine (not shown) or by other known methods. In other embodiments, user interface 203 displays the recognized speech string without alteration, and feedback and response rendering interface 204 renders feedback on text input 208 from conversation engine 203 separately. This separate rendering allows the user to edit the original text-converted string easily.

Example output of conversation engine 202 includes speech response 210 and visual response 209 for display. Speech component 211 of speech response 210 provides feedback to the user identifying a portion of the input that system 213 has determined is important. Example feedback includes (1) requesting clarification on the portion of the input, (2) repeating the portion of the input, (3) suggesting a completion of the portion of user input, (4) providing a brief summary (e.g., a "synopsis") of requested content items in response to speech input 200, and/or (5) providing the entire subset of requested content items found in response to speech input 200. An example of requesting clarification includes system 213 prompting "did you mean 'Java' programmers or 'Jabba' the Hutt?" An example of repeating the portion of the input includes system 213 repeating an incorrectly recognized portion of the input, e.g. "Bolton area," when speech input 200 included "Boston area." An example of suggesting a completion includes, in response to speech input 200 of "in what movie did Jessica Chastain act that was directed by Terrence<pause>," system 213 responds "Terrence Malick"). An example of a synopsis of requested content items includes system 213 responding "over 100 Java programmers in the Boston area." An example of providing the entire subset of requested content items includes system 213 listing the Java programmers found. Text to speech converter 206 converts speech component 210 of conversation engine 202 into speech output 211.

In some embodiments, text-to-speech converter 206 also feeds speech output 207 to speech recognizer 201, for example for rendering for audio output, so that speech recognizer 201 may filter system output from the user speech. This filtering assumes system 213 is designed to avoid traditional audio feedback loop ringing. If system 213 feeds the audio output directly to headphone out jack, this audio feedback is not necessary because the user hears the system output directly, without the system output being detected by a microphone. In some embodiments, the system audio output is given lower precedence and shut off when system 213 detects the user speaking, so as to not interrupt the user. In other embodiments, the system may not shut off audio output, for example in cases where the audio output is headphone output. This situation simulates real life conversations in which one person interrupts another. For example, system 213 "interrupts" the user upon a determination of a confidence measure that presenting the requested results to the user (i.e., presenting the requested subset of content items) would remove the need for the user to finish providing the remainder of speech input 200. This functionality may benefit from careful design from an interface perspective, so as to avoid system 213 appearing "rude" to the user.

Figure 3:
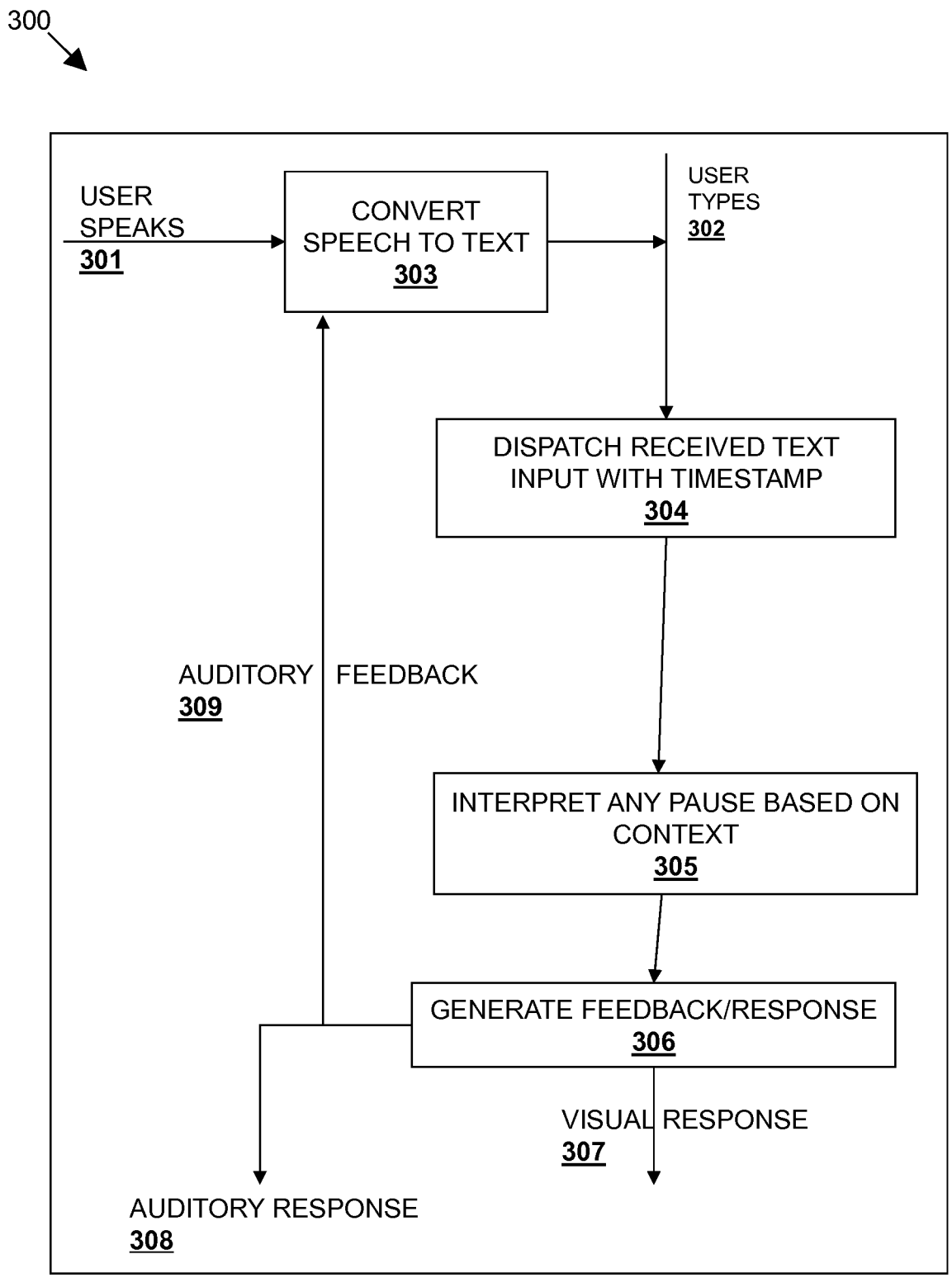
FIG. 3 represents an example flow of data in the present systems, in accordance with some embodiments.

FIG. 3 illustrates an example flow 300 of data in the present systems, in accordance with some embodiments. The present system receives text input 302. In some embodiments, text input 302 is received as text input directly typed by the user. In other embodiments, text input 302 is determined using speech-to-text conversion (step 303) of user speech 301. The present system time stamps text input 302 with pause information within and across sentences (step 304). Some embodiments use conversational context to interpret the pause information (step 305). The present system uses the resulting interpretation to generate feedback or results in a response to the user (step 306). Techniques for interpreting pauses in speech are described below, in connection with FIGS. 6-10. Techniques for interpreting pauses in speech are further set forth in U.S. patent application Ser. No. 13/801,837, entitled A Method for Using Pauses Detected in Speech Input to Assist in Interpreting the Input During Conversational Interaction for Information Retrieval, filed Mar. 13, 2013. Those techniques can be used in conjunction with the techniques disclosed herein. In some embodiments, the generated response includes visual component 307 and a speech component. The present system plays back the speech component to user 308 and also uses the speech component as auditory feedback 309. For example, the present system cancels the played back signal in the event that a microphone input can detect auditory feedback 309.

Figure 4:
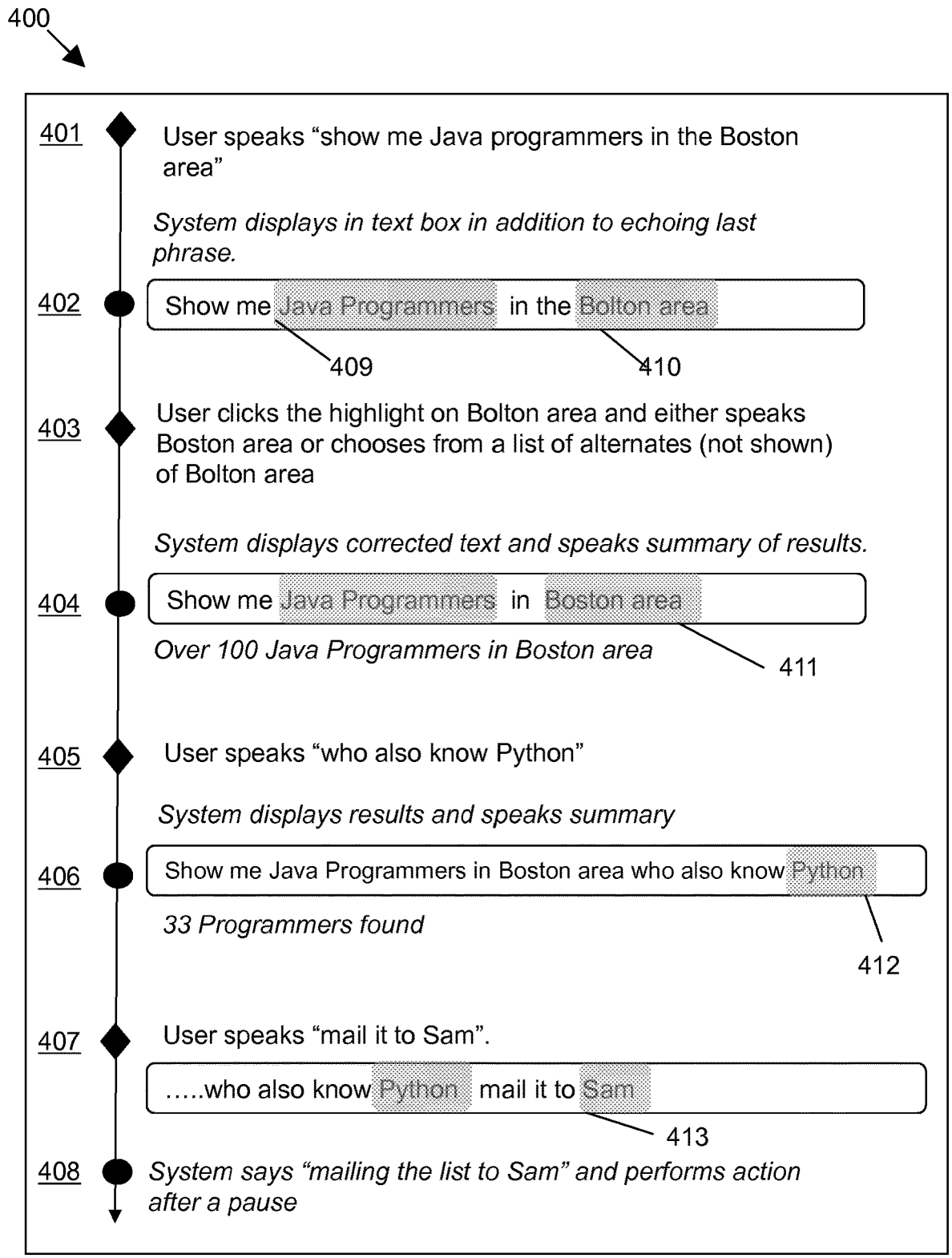
FIGS. 4-5 illustrate example conversational interactions between the present system and a user, in accordance with some embodiments.

FIG. 4 illustrates an example conversational interaction 400 between the present system and a user, in accordance with some embodiments. The user speaks "show me Java programmers in the Boston area" (exchange 401). At any point, the present system allows the user could provide disfluencies such as pausing at any point for feedback from the present system, if user doubts that he or she was understood. For example, if the user pauses after speaking "show me java" or "show me java programmers," the present system determines that a portion of the input received so far has an importance measure that exceeds a threshold value. The present system provides feedback and/or prompts on the portion of the input determined to have the importance measure, such as "Java programmers" or "Boston area." For example, the present system provides feedback on portions of input denoted by phrase boundaries, or generally on any portion of input computed to be important. Some embodiments may determine the importance measure based on related metadata stored in a graph theoretic data structure of nodes and entities, described in further detail below. In some embodiments, the importance measure identifies input portions that could benefit from clarification, disambiguation, or confirmation by the present system. The present system provides feedback to the user identifying the portion of the input determined to be important (i.e., the present system provides feedback or confirmation on important phrases or terms spoken so far).

When providing confirmation, the present system performs almost like a personal assistant taking down dictation and echoing back certain phrases or words uttered, so that the person dictating is aware that the personal assistant's transcription to text is being done correctly. Thus, in some embodiments the present system begins by repeating the portion of the input determined to be important (i.e., echoing back phrases spoken by the user). In further embodiments, the present system uses the success rate of recognition and/or comprehension over time to adjust the feedback. For example, if the first feedback provided is "Java programmers," and the second feedback is "James Gosling" (co-creator of the Java programming language), a third example of feedback is confirming "yes, Python—got it" upon the present system recognizing a further portion of the input indicating another programming language.

In other embodiments, the importance measure is a confidence score received from the speech-to-text converter, and the feedback is repeating a portion of the input that the present system determines falls below the confidence score. In contrast to the example given earlier, this example describes a scenario in which the present system provides feedback by repeating the portion of the input, because the system has determined that the speech-to-text conversion process may have yielded incorrect results. Other embodiments of the importance measure may indicate that there are many close phonetic variations that match the input from the user.

In example exchange 401, the user types and/or speaks a full sentence containing two portions of input having high importance measures: Java programmers 409 and Bolton area 410. In some embodiments, the present system provides feedback by providing an auditory repetition of the last phrase "Bolton area", and also visually highlights the portions of interest (exchange 402) to enable easy editing for the user. The present system receives a second input from the user (exchange 403). For example, the user clicks or taps the second phrase "Bolton area" 410, in order to fix a recognition error ("Boston" being wrongly recognized as "Bolton"). The present system infers that the user intends to alter the first input (exchange 401) using a second input. For example, the present system infers that the user intends to alter the first input based on determining a similarity between the second input and the corresponding input portion of the first input. The similarity may be based on detecting similar characters in the second input and corresponding input portion, or based on detecting similar variations such as phonetic variations between the second input and corresponding input portion. In some embodiments, the user fixes the recognition error by speaking the second input 411 "Boston area" again, or by choosing from a list of variants of "Bolton," one variant being "Boston." The present system is able to determine an alternative query input using the second input. Even in the case where the second input involves visual interaction, the user does not have to use traditional methods of text correction and does not have to struggle to place an insertion point at the end of the word "Bolton" to correct the recognition error. Instead, the present system allows the user to touch the highlighted region around the identified portion of the input "Bolton area." The present system allows the user to edit the portion of the input using a second input, either by either speaking the portion of the input again or typing the portion of the input "Boston."

The present system selects a subset of relevant content items, based on comparing the alternative query input and metadata associated with the subset of content items. For example, the present system responds with a summary of results (exchange 404) for the alternative query input. The results are based on associated metadata, such as metadata identifying Java programmers. In some embodiments, the response includes a visual display combined with a spoken or auditory version of the relevant content items. The user may then provide subsequent input, such as "who also know Python" (exchange 405). In some embodiments, the user starts to speak even before the present system has finished providing the results that there are over one hundred Java programmers. Upon hearing the user begin to speak (e.g., based on microphone activity), some embodiments immediately suspend playback of the response. This situation is analogous to conversations between humans, in which a speaker may pause as soon as someone else interrupts. The present system infers that the second input is intended to supplement the existing input. The present system responds with a revised subset of content items, such as a summary of thirty-three programmers for the new query (exchange 406).

As described earlier, the present system infers that the user intended to supplement the existing query. The present system adds the newly spoken query to the existing text displayed on screen, with the newly added phrase Python highlighted (exchange 412). In some embodiments, the present system allows the user to use the search bar interface to continue a conversation. The user can comfortably use an existing search interface for keyword search, not to only type in natural language input but also to conduct a conversation as though the user is simply adding an additional word in text-based incremental search. As described earlier, some embodiments track disfluencies such as pauses in receiving text input, and break down a stream of input (either typed as text input, text input converted from speech, or a combination), into sentences and phrases based on pause information and prior user interactions with the interface.

Furthermore, the present user interface allows users already comfortable with keyword search to use the familiar interface, without having to be aware the interface is capable of spoken input and natural language input. For example, after hearing the synopsis summary of the subset of content items (exchange 406), the user then speaks an action such as "mail it to Sam" (exchange 407). The present system identifies "Sam" as an input portion based on an importance measure. The present system provides feedback to the user identifying the input portion. For example, the present system repeats "Sam" to the user. The present system also highlights the input portion of the input "Sam," enabling the user to edit the highlighted input portion if incorrect. The present system infers that the user intended to supplement the previous conversational exchange, and mails the list of thirty-three programmers to Sam. The system mails the list after a pause, to allow the user to edit the input portion "Sam" if necessary. This example illustrates an interaction sequence that involves auditory and visual input and output. As described earlier, the present system does not require both auditory and visual input and output—any subset or combination of these inputs and outputs are possible based on the particular implementation and usage scenario.

Figure 5:
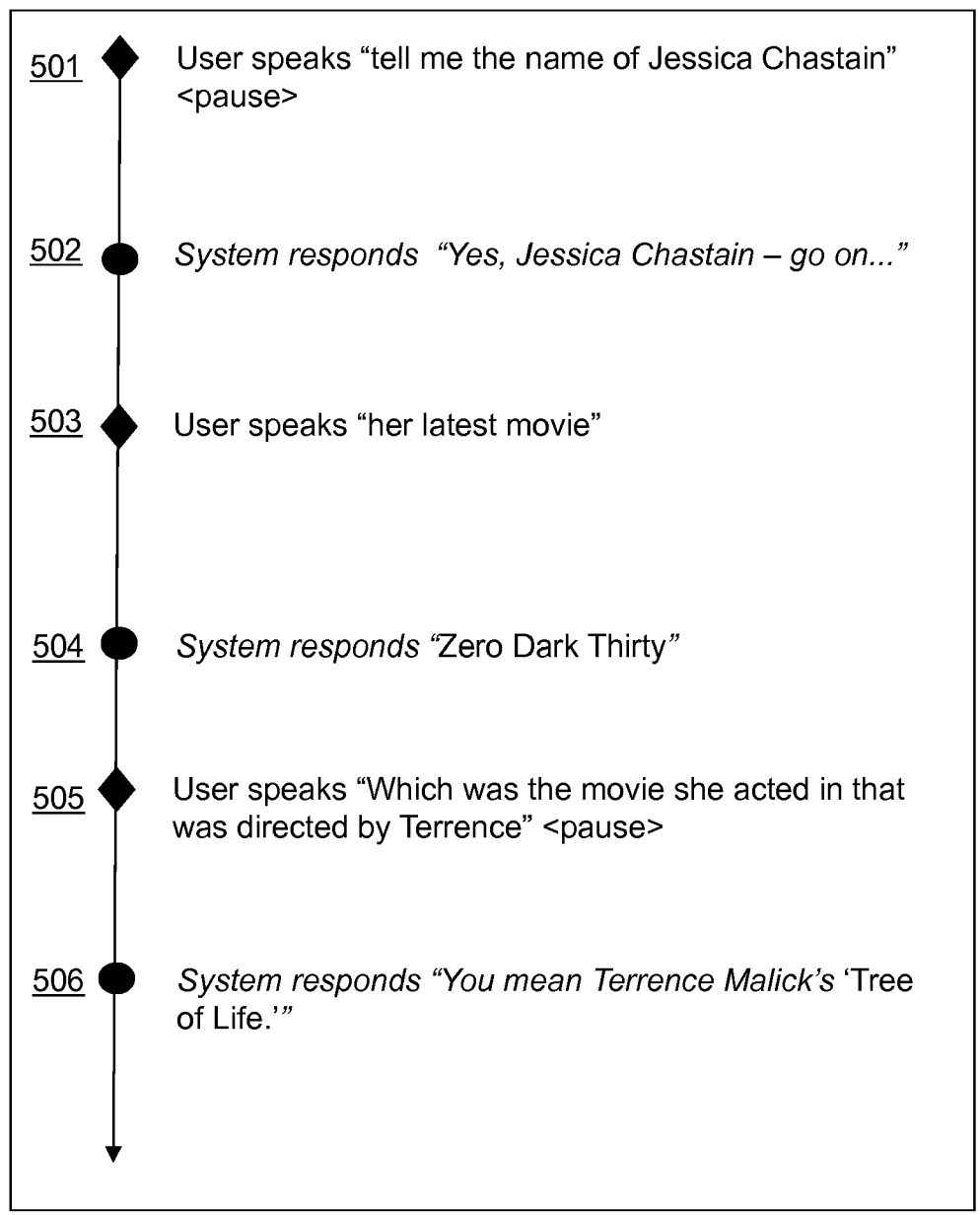

FIG. 5 illustrates an example conversational interaction 500 between the present system and a user, in accordance with some embodiments. Conversational interaction 500 illustrates an example case in which the user interaction does not involve visual display for the input or output. In other words, conversational interaction 500 illustrates audio as the only means of communication.

The user provides a first input, "tell me the name of Jessica Chastain" and pauses for confirmation that the present system correctly identified the input portion of interest to the user (exchange 501). The present system identifies that the input portion "Jessica Chastain" has an importance measure that exceeds a threshold value. Accordingly, the present system provides feedback to the user identifying the input portion. For example, the present system responds with "Yes, Jessica Chastain, go on . . . " (exchange 502). The feedback provided by the system represents a natural audio response, given that the first input from the user is partial and an incomplete sentence (in contrast to the user merely typing in a keyword) and given that the first input is a voice input. (Some embodiments track a source of the first input being text or voice, despite the speech-to-text conversion of the voice input). The user then provides a subsequent input "in her latest movie" (exchange 503). The present system infers that the user intended to supplement the first input with the second input. The present system determines an alternative query input by combining the first input with the second input, and selects a subset of content items by comparing the alternative query input with corresponding metadata. Based on the selected subset of content items, the present system responds "Zero Dark Thirty" (exchange 504), the most recent movie in which Jessica Chastain acted at the time of the user query. Some embodiments use grammatical rules applied to sentence structure to determine if the input is complete or partial. For example, if the grammatical rules engine determines that a subject, direct object, and/or indirect object of a sentence is missing, the present system determines that the input is incremental or partial. Other embodiments use probabilistic classifier techniques, such as a naive Bayes classifier, to determine when an input is incomplete. Still other embodiments infer that an exchange is incomplete based on relationships between detected entities in the exchange. For example, the present system infers exchange 501 to be incomplete based on relationships detected among grammatical entities in the exchange, because it does not make sense for a user to ask the name ("tell me the name") of someone whom they have just named ("of Jessica Chastain").

The user asks a follow up question, "which was the movie she acted that was directed by Terrence," and pauses to recall the director's full name (exchange 505). The present system determines that a portion of the input ("Terrence") has an importance measure that exceeds a threshold, based on the detected disfluency (e.g., based on the pause from the user). The present system further determines that the user intended to supplement the existing query, and determines an alternative query input that combines the term "Terrence" with the existing query (e.g., Jessica Chastain movie). The present system selects a subset of content items based on comparing the alternative query input and corresponding metadata. Upon discovering a strong unambiguous match (for example, both for the recognized input portion ("Terrence") and also for the selected subset of content items (e.g., "Tree of Life" movie)) that rates a response success rate above a threshold, the present system interrupts the user to present the subset of content items. For example, the present system interjects with "you mean Terrence Malick's 'Tree of Life'" (exchange 506). In some embodiments, the response success rate for a matching subset of content items is determined based on factors including counts of ambiguities in user input, counts of error corrections needed to arrive at a match, counts of "hops" between nodes in a graph data structure representing the conversational context to arrive at the match (in embodiments that use information represented in graph theoretic format, as described below), and/or a measure of relatedness of the match to previous conversational interactions between the system and the user. In further embodiments, exchange 506, while illustrated in audio form, may also occur in a combination of text and audio. Also, as described earlier, the user input may be a string of keywords provided in text form by the user. The present system responds with the same interjection even in response to text input. In further embodiments, the interjection is passive, in that the present system displays results as soon as user types "Terrence."

While in the example scenario described above, the present system proactively presents the subset of content items to the user upon determining that the user's intent was unambiguous, the present incremental speech interface also allows for input disambiguation even before the user finishes expressing an intent fully. For instance, if user intends to ask the question "are the sox on tonight," and speaks "are the sox" and pauses to hear feedback on the input portion "sox," the present system provides feedback in the form of automatically disambiguating the received input such as the baseball teams "Boston Red Sox" and "Chicago White Sox." If the user had fully spoken the sentence, "are the sox on tonight," and assuming the present system was not aware of personal preferences of the user, the present system would provide feedback using a follow-up question to disambiguate the received input. For example, the present system asks "did you mean the Boston Red Sox or Chicago White Sox?" As described earlier, the present system may provide feedback both in visual and auditory form. Furthermore, in the present incremental search, the disambiguation may occur as the user is expressing intent. For example, the present system uses a disfluency (e.g., pause) provided by the user at phrase boundaries to provide feedback in the form of confirmation to the user that the system received correct speech-to-text conversion on the input phrases. The present system further uses a detected disfluency identify an input portion for disambiguation when the input has ambiguities. In other words, the user uses pauses at phrase boundaries to confirm that the present system understood the input correctly (with the ability to edit the input immediately if understood incorrectly). The user further uses pauses at phrase boundaries to disambiguate intent. As illustrated earlier, when the present system determines that an expected response success rate surpasses a threshold, the detected disfluencies remove even the need for the user to express further intent. As described earlier, the techniques set forth in U.S. patent application Ser. No. 13/801,837, can be used to infer the meaning from a user's pause in speech and/or any other speech disfluency. For example, if a pause occurs after a partial sentence input, the present system infers that the user seeks confirmation that he or she was understood. In contrast, if the pause precedes what may be predicted to be an input portion of input, the present system infers that the user is uncertain in the input, and the system weights the corresponding importance measure of the input portion accordingly.

Disfluency Detection and Usage

Figure 6:
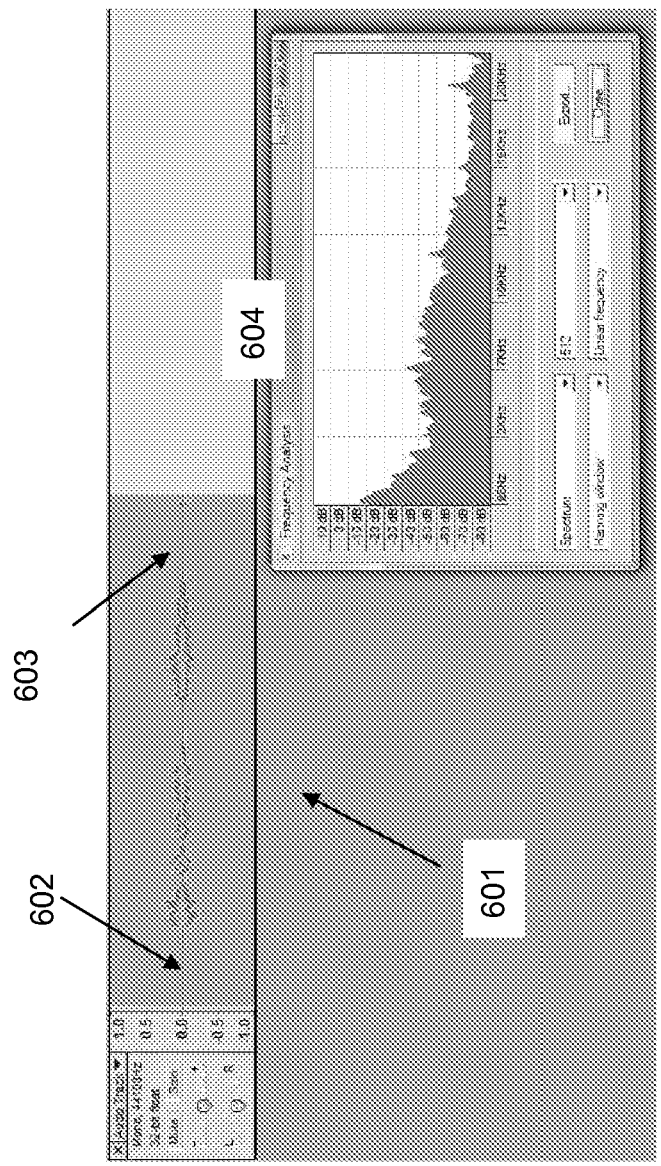
FIGS. 6-8 illustrate example waveform samples for the user input "Who acted in the movie Tomorrow Never Dies," in accordance with some embodiments.
Figure 7:
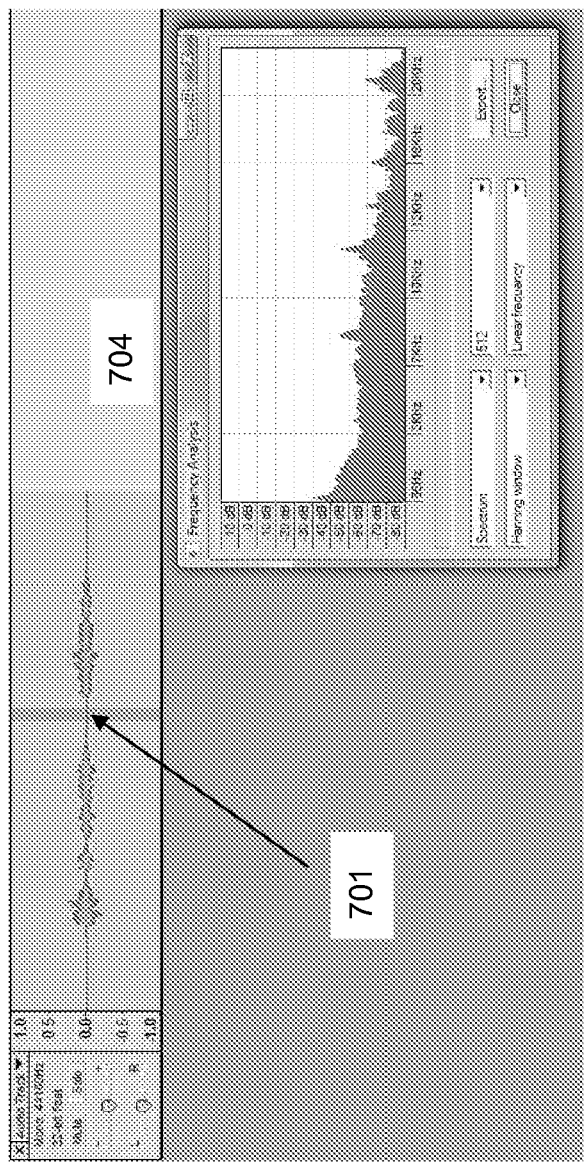
Figure 8:
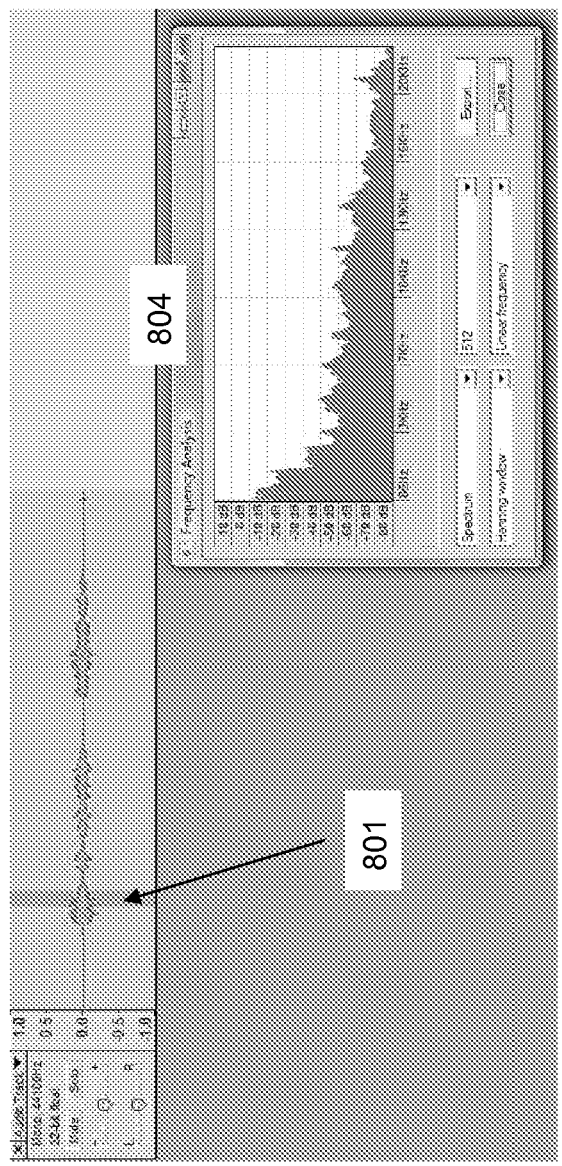

FIGS. 6-8 illustrate example waveform samples for the user input "Who acted in the movie Tomorrow Never Dies," in accordance with some embodiments.

<pause duration=800 ms>who acted in the movie<pause duration=550 ms>tomorrow never dies<pause duration=1200 ms>

Speech input 601 is flanked by front-end pause/silence 602 and tail-end pauses/silence 603. In addition, within speech input 601, there is a pause 701 for 550 milliseconds. These pauses and/or silence are indicated by a low intensity of the speech input sound wave. Unlike these pauses, speech portion 801 has a high intensity, indicating that speech portion 801 is not a disfluency or pause. One meaning of the term pause, as used herein, is a period of relative silence when user is not speaking, but the audio input may include ambient sounds. For example, the present system may analyze frequency—power spectra 604, 704, and 804 to detect speech versus a pause according to input power levels. As shown in power spectra 704, 804, pause 701 has an intensity of about −60 dB, and speech portion 801 has an intensity of about −50 dB. Since the unit of decibels (dB) is a logarithmic unit, there is about a factor of 10 difference in the intensity of the pause and the speech portion. In some embodiments standard speech-to-text engines perform the disfluency detection, taking into account ambient sounds.

As illustrated above, a pause is detected when there is a period with an absence of or a low intensity of sound. The cut-off intensity of sound to distinguish a pause from a vocalized portion of speech input can be predefined, for example, at −55 dB. On the other hand, the cut-off intensity may be relative to the speech input and the background noise. The cut-off intensity can be chosen, for example, at 20% of the average intensity of the speech input. If background noise is high, the cut-off intensity can be chosen at 30% of the average intensity. Also, the minimum pause period of a low sound intensity which constructs a pause may be predefined. For example, the minimum pause period may be 300 ms. Alternatively, the minimum pause period may vary depending on the speed at which the user speaks. If the speech input is spoken fast, the minimum pause period can be shorter. If the speech input is spoken slow, the minimum pause period can be longer. Therefore, the present system detects a pause when there is a period longer than the minimum pause period with a sound intensity smaller than the cut-off intensity.

Traditional speech-to-text engines may attempt to determine words and/or phrase based on the audio input during the pause, or may simply stop language processing during the pause. One distinction of the embodiments described herein is that the presently disclosed techniques include the fact that the pause occurred as input to the modules downstream of the speech-to-text engine for use in determining the user's intent or for helping the user form the query request itself. In addition to the use of pauses, other forms of disfluencies, including auditory time fillers, are used in speech processing. In the event user speaks additive filler words or sounds to accompany a pause, those filler words and sounds may be recognized as pause additives by the downstream modules that process the output of the speech-to-text engine. For instance, use of filler words such as "like" followed by pause, or sounds such as "umm," "hmm," "well," "uh," and "eh" followed by a pause are also considered collectively as a pause with the overall pause duration including the duration of utterance of the filler words. In other embodiments, auditory filler words are not followed by a pause. Typically, auditory time fillers are continuous and lack variations in tone and volume. These characteristics may aid the detection of auditory time fillers.

If the user's speech input, on the other hand, was "Is there a Red Sox game tomorrow?," there is unlikely to be a cognitive recall latency preceding the word "tomorrow" because the occurrence of the input portion "tomorrow" is part of the very reason for asking the question. In contrast, during the speech input "Who acted in (pause) Tomorrow Never Dies?" user may pause before "tomorrow" to consciously demarcate the phrase boundary (i.e., to identify the portion of the phrase "Tomorrow Never Dies" as a distinct item) or just pause to perform cognitive recall. By using the pause preceding the phrase "Tomorrow Never Dies" to identify the phrase as an input portion, the present information retrieval system can better understand that the user's intent involves that input portion. This valuable piece of information can be used to constrain the search to information involving only that input portion, or input portions that are returned by the search that are related to the movie "Tomorrow Never Dies" can be given a higher relevance weight.

In the case of demarcating the phrase boundary, the user may confidently speak the portion following the pause. Accordingly, the present system can determine the portion following the pause as a certain phrase or title based on the loudness or speed of the speaker's voice. Another method to distinguish whether the portion following the pause is a confident phrase or an uncertain phrase can be based on a further utterance following the initial pause. If a person is uncertain about a phrase, he or she may engage in another pause. Also, a pause followed by a confident phrase may be relatively short. So the system may first assume that a phrase or title following a short pause is a confident phrase. Then, the system performs a search, but if the system does not find any result, the system may infer that the phrase following the short pause is uncertain.

As mentioned above, the presence of a pause within the speech input can be used as a confidence measure of portions of the input itself. The interpretation of the duration of pauses and their frequency of occurrence is also factored in by embodiments of the present invention to distinguish the cases of user just speaking slowly (so that speech recognition may work better) versus pausing to perform cognitive recall. For example, assume the user speech input was "Who acted in (pause) The Day Never Dies?" In this case, the system can use the pause to indicate that the user may be uncertain of the name of the item for which he/she is requesting information. Thus, when the system does not find an item corresponding to "The Day Never Dies", the system can respond with questions, guided by the user input (using, e.g., techniques set forth in the incorporated applications as described above) in order to help the user define his/her intent.

In addition, the present system may place lower search priority on the low confidence item as a whole and, instead, use the high confidence items to guide the search. For example, the system can place high confidence on the portion "Who acted in" in order to focus on results from an audio/video entertainment domain (based on the word "acted"). Knowing this domain, the system can further refine the search based on portions of the low confidence input. For example, the system can perform queries based on combinations of the words of the low confidence portion in order to find what the user is looking for or to at least provide some options to the user. Thus, the system may respond with a statement that it cannot find a movie "The Day Never Dies" and inquire if the user meant "Love Never Dies" or "Tomorrow Never Dies."

Figure 9:
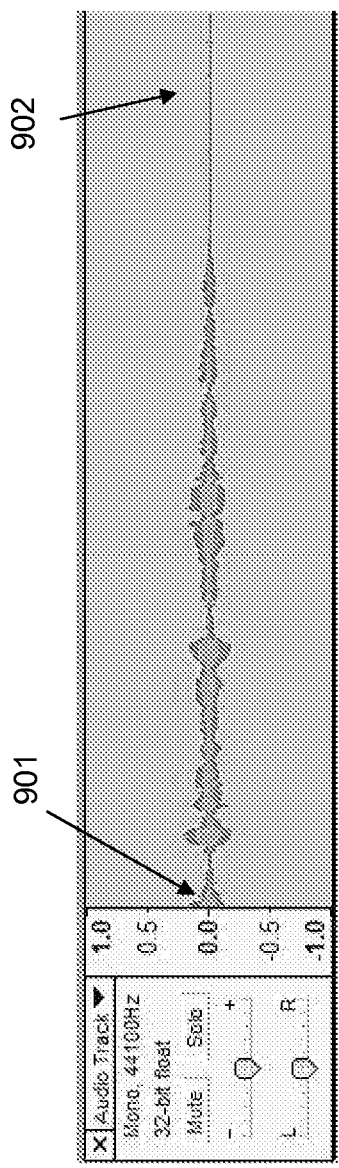
FIGS. 9-10 illustrate example waveforms exhibiting the use of the lack of pauses to detect clipping in speech input, in accordance with some embodiments.
Figure 10:
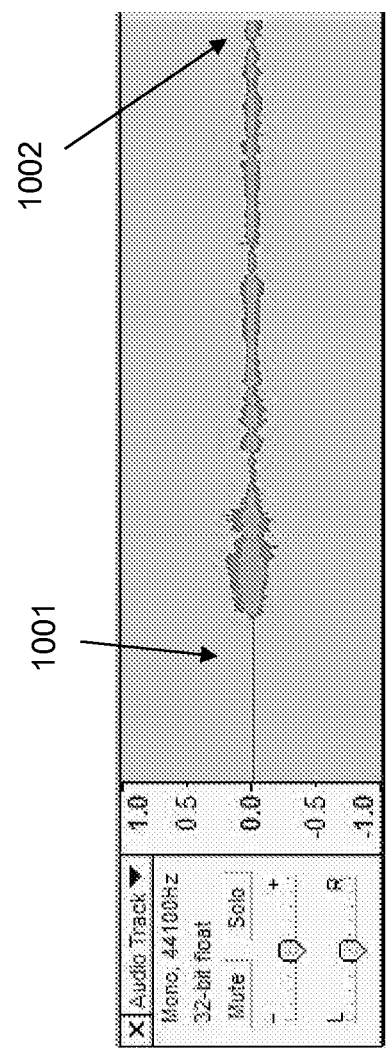

FIGS. 9-10 illustrate example waveforms exhibiting the use of the lack of pauses to detect clipping in speech input, in accordance with some embodiments. Specifically, FIG. 9 illustrates front-end clipping 901 and FIG. 10 illustrates tail-end clipping 1002. Front-end clipping 901 and tail end clipping 1002 are detected by the speech-to-text engine in conjunction with the other modules and encoded along with speech input as illustrated above. In contrast, the presence of tail end pause 902 and front-end pause 1001 clearly demarcate the speech input. Traditional speech-to-text engines may map clipped sounds to approximately matching words or just emit phonetic text equivalent of sounds. Implementations of the present invention recognize the absence of these flanking pauses and use their presence as additional information for interpreting the meaning of user input. For example, rather than merely finding the word that most closely matches the clipped portion 901, the illustrative embodiment considers the possibility that a different word, having a matching suffix, was intended by the user.

Information Repositories

In some embodiments, the present invention uses information repositories to search the query result or to find a substitute word or phrase. Information repositories are associated with domains, which are groupings of similar types of information and/or certain types of content items. Certain types of information repositories include entities and relationships between the entities. Each entity/relationship has a type, respectively, from a set of types. Furthermore, associated with each entity/relationship are a set of attributes, which can be captured, in some embodiments, as a defined finite set of name-value fields. The entity/relationship mapping also serves as a set of metadata associated with the content items because the entity/relationship mapping provides information that describes the various content items. In other words, a particular entity will have relationships with other entities, and these "other entities" serve as metadata to the "particular entity". In addition, each entity in the mapping can have attributes assigned to it or to the relationships that connect the entity to other entities in the mapping. Collectively, this makes up the metadata associated with the entities/content items. In general, such information repositories may be referred to herein as structured information repositories. Examples of information repositories associated with domains follow below.

A media entertainment domain includes entities, such as, movies, TV-shows, episodes, crew, roles/characters, actors/personalities, athletes, games, teams, leagues and tournaments, sports people, music artists and performers, composers, albums, songs, news personalities, and/or content distributors. These entities have relationships that are captured in the information repository. For example, a movie entity is related via an "acted in" relationship to one or more actor/personality entities. Similarly, a movie entity may be related to an music album entity via an "original sound track" relationship, which in turn may be related to a song entity via a "track in album" relationship. Meanwhile, names, descriptions, schedule information, reviews, ratings, costs, URLs to videos or audios, application or content store handles, scores, etc. may be deemed attribute fields.

A personal electronic mail (email) domain includes entities, such as, emails, email-threads, contacts, senders, recipients, company names, departments/business units in the enterprise, email folders, office locations, and/or cities and countries corresponding to office locations. Illustrative examples of relationships include an email entity related to its sender entity (as well as the to, cc, bcc, receivers, and email thread entities.) Meanwhile, relationships between a contact and his or her company, department, office location can exist. In this repository, instances of attribute fields associated with entities include contacts' names, designations, email handles, other contact information, email sent/received timestamp, subject, body, attachments, priority levels, an office's location information, and/or a department's name and description.

A travel-related/hotels and sightseeing domain includes entities, such as, cities, hotels, hotel brands, individual points of interest, categories of points of interest, consumer facing retail chains, car rental sites, and/or car rental companies. Relationships between such entities include location, membership in chains, and/or categories. Furthermore, names, descriptions, keywords, costs, types of service, ratings, reviews, etc. all amount of attribute fields.

An electronic commerce domain includes entities, such as, product items, product categories and subcategories, brands, stores, etc. Relationships between such entities can include compatibility information between product items, a product "sold by" a store, etc. Attribute fields in include descriptions, keywords, reviews, ratings, costs, and/or availability information.

An address book domain includes entities and information such as contact names, electronic mail addresses, telephone numbers, physical addresses, and employer.

The entities, relationships, and attributes listed herein are illustrative only, and are not intended to be an exhaustive list.

Some embodiments may also use repositories that are not structured information repositories as described above. For example, the information repository corresponding to network-based documents (e.g., the Internet/World Wide Web) can be considered a relationship web of linked documents (entities). However, in general, no directly applicable type structure can meaningfully describe, in a nontrivial way, all the kinds of entities and relationships and attributes associated with elements of the Internet in the sense of the structured information repositories described above. However, elements such as domain names, internet media types, filenames, filename extension, etc. can be used as entities or attributes with such information.

For example, consider a corpus consisting of a set of unstructured text documents. In this case, no directly applicable type structure can enumerate a set of entities and relationships that meaningfully describe the document contents. However, application of semantic information extraction processing techniques as a pre-processing step may yield entities and relationships that can partially uncover structure from such a corpus.

Illustrative Examples of Accessing Information Repositories

The following description illustrates examples of information retrieval tasks in the context of structured and unstructured information repositories as described above.

In some cases, a user is interested in one or more entities of some type—generally called intent type herein—which the user wishes to uncover by specifying only attribute field constraints that the entities must satisfy. Note that sometimes intent may be a (type, attribute) pair when the user wants some attribute of an entity of a certain type. For example, if the user wants the rating of a movie, the intent could be viewed as (type, attribute)=(movie, rating). Such query-constraints are generally called attribute-only constraints herein.

Whenever the user names the entity or specifies enough information to directly match attributes of the desired intent type entity, it is an attribute-only constraint. For example, when the user identifies a movie by name and some additional attribute (e.g., 'Cape Fear' made in the 60s), or when he specifies a subject match for the email he wants to uncover, or when he asks for hotels based on a price range, or when he specifies that he wants a 32 GB, black colored iPod touch.

However, in some cases, a user is interested in one or more entities of the intent type by specifying not only attribute field constraints on the intent type entities but also by specifying attribute field constraints on or naming other entities to which the intent type entities are connected via relationships in some well-defined way. Such query-constraints are generally called connection oriented constraints herein.

An example of a connection oriented constraint is when the user wants a movie (an intent type) based on specifying two or more actors of the movie or a movie based on an actor and an award the movie won. Another example, in the context of email, is if the user wants emails (intent type) received from certain senders from a particular company in the last seven days. Similarly, a further example is if the user wants to book a hotel room (intent type) to a train station as well as a Starbucks outlet. Yet another example is if the user wants a television set (intent type) made by Samsung that is also compatible with a NINTENDO WII. All of these are instances of connection oriented constraints queries.

In the above connection-oriented constraint examples, the user explicitly describes or specifies the other entities connected to the intent entities. Such constraints are generally referred to herein as explicit connection oriented constraints and such entities referred to herein as explicit entities.

Meanwhile, other queries contain connection oriented constraints that include unspecified or implicit entities as part of the constraint specification. In such a situation, the user is attempting to identify a piece of information, entity, attribute, etc. that is not known through relationships between the unknown item and items the user does know. Such constraints are generally referred to herein as implicit connection oriented constraints and the unspecified entities are generally referred to herein as implicit entities of the constraint.

For example, the user may wish to identify a movie she is seeking via naming two characters in the movie. However, the user does not recall the name of one of the characters, but she does recall that a particular actor played the character. Thus, in her query, she states one character by name and identifies the unknown character by stating that the character was played by the particular actor.

However consider the following user constraints for specific information retrieval goals: The user wants the role (intent) played by a specified actor (e.g., 'Michelle Pfeiffer') in an unspecified movie that is about a specified role (e.g., the character 'Tony Montana'.) In this case the user's constraint includes an unspecified or implicit entity which corresponds to the movie 'Scarface.' Similarly, suppose that the user wants the movie (intent) starring the specified actor 'Scarlett Johannsen' and the unspecified actor who played the specified role of 'Obe Wan Kanobi' in a specified film 'Star Wars.' In this case the implicit entity is the actor 'Ewan McGregor' and the intent entity is the movie 'The Island' starring 'Scarlett Johannsen' and 'Ewan McGregor'.

In the context of email repository, an example includes a user wanting to get the last email (intent) from an unspecified gentleman from a specified company 'Intel' to whom he was introduced via email (an attribute specifier) last week. In this case, the implicit entity is a contact who can be discovered by examining contacts from 'Intel', via an employee/company relationship, who was a first time common-email-recipient with the user last week.

The above three examples are connection oriented constraints but include unspecified or implicit entities as part of the constraint specification. The present disclosure refers to such constraints herein as implicit connection oriented constraints and refers to unspecified entities herein as implicit entities of the constraint.

In the context of connection oriented constraints, it may be useful to map entities and relationships of information repositories to nodes and edges of a graph theoretic data structure. The motivation for employing a graph model in lieu of an entity relationship model is the observation that relevance, proximity and relatedness in natural language conversation can be modeled simply by notions such as link-distance and, in some cases, shortest paths and smallest weight trees. During conversation when a user dialog involves other entities related to the actually sought entities, a subroutine addressing information retrieval as a simple graph search problem effectively helps reducing dependence on deep unambiguous comprehension of sentence structure, which can be a huge implementation benefit. Even if user intent calculation is ambiguous or inconclusive, so long as entities have been recognized in the user utterance, a graph-interpretation based treatment of the problem enables our system to respond in a much more intelligible manner than otherwise possible.

Some embodiments of the present invention use a signature of user preferences (which captures user activity and interests, both implicitly and explicitly determined) in a context dependent manner and, if applicable, applies personalization to selection of a word preceded by a pause or a clipped word in case of front-end clipping and tail-end clipping. Personalization can also be applied to result selection to offer the best response that has a high likelihood of matching user's intent. Certain embodiments of the present invention use the signature of user preferences, if available, to resolve ambiguity in user's input.

A user preference signature can be provided by the system using techniques for discovering and storing such user preference information. For example, the methods and systems set forth in U.S. Pat. No. 7,774,294, entitled Methods and Systems for Selecting and Presenting Content Based on Learned Periodicity of User Content Selections, issued Aug. 10, 2010, U.S. Pat. No. 7,835,998, entitled Methods and Systems for Selecting and Presenting Content on a First System Based on User Preferences Learned on a Second System, issued Nov. 16, 2010, U.S. Pat. No. 7,461,061, entitled User Interface Methods and Systems for Selecting and Presenting Content Based on User Navigation and Selection Actions Associated with the Content, issued Dec. 2, 2008, and U.S. Pat. No. 8,112,454, entitled Methods and Systems for Ordering Content Items According to Learned User Preferences, issued Feb. 7, 2012, each of which is incorporated by reference herein, can be used with the techniques disclosed herein. However, the use of user's preference signatures and/or information is not limited to the techniques set forth in the incorporated applications.

In the foregoing description, certain steps or processes can be performed on particular servers or as part of a particular engine. These descriptions are merely illustrative, as the specific steps can be performed on various hardware devices, including, but not limited to, server systems and/or mobile devices. Similarly, the division of where the particular steps are performed can vary, it being understood that no division or a different division is within the scope of the invention. Moreover, the use of "analyzer", "module", "engine", and/or other terms used to describe computer system processing is intended to be interchangeable and to represent logic or circuitry in which the functionality can be executed.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

What is claimed is:

1. A computer-implemented method for selecting and presenting content items based on user input, the method comprising:
   providing access to a set of content items, the set of content items associated with metadata that describes a corresponding content item;
   sequentially receiving a first input from the user and a second input from the user, wherein the first input comprises one or more complete words and the second input comprises one or more complete words, wherein the second input is received without an intervening input between the second input and the first input;
   determining whether at least a portion of the first input received from the user and at least a portion of the second input received from the user are phonetically similar;
   inferring an intent to alter the first input based on determining that the at least a portion of the first input received from the user is phonetically similar to the at least a portion of the second input received from the user;
   based on inferring the intent to alter the first input, determining an alternative query input by replacing a portion of the first input received from the user with a portion of the second input received from the user;
   based on determining that the at least a portion of the first input received from the user is not phonetically similar to the at least a portion of the second input received from the user, determining the alternative query input by combining the first input received from the user and the second input received from the user, wherein the at least a portion of the first input comprises at least one complete word and the at least a portion of the second input comprises at least one complete word;
   performing a search using the alternative query to select a subset of content items from the set of content items by comparing the alternative query input with the metadata associated with the subset of content items; and
   presenting the subset of content items to the user.

2. The method of claim 1, further comprising determining that the first input received from the user is a request for one or more content items.

3. The method of claim 1, further comprising providing feedback to the user identifying a portion of the first input received from the user.

4. The method of claim 1, further comprising:
   determining that the portion of the first input received from the user is important, and
   in response to determining that the portion of the first input received from the user is important, providing feedback to the user identifying the portion of the first input received from the user.

5. The method of claim 1, wherein selecting the subset of content items is based further upon a disfluency identified in the first input received from the user, and based further upon prior conversational interactions that are determined to be related to the first input received from the user and the second input received from the user.

6. The method of claim 1, wherein the providing the feedback includes at least one of:
   requesting clarification on the identified portion of the first input received from the user,
   suggesting a completion of the received first input received from the user, and repeating the portion of the first input received from the user to the user, so as to notify the user that the portion of the first input received from the user is potentially incorrectly recognized.

7. The method of claim 1, wherein the presenting the subset of content items includes presenting the subset of content items before receiving completed input from the user, upon a determination of a strong recognition match for the first input received from the user and upon a determination that a responsiveness measure of the selected subset of content items would be sufficient.

8. The method of claim 1, wherein determining whether the portion of the first input received from the user and the second input received from the user are phonetically similar includes detecting similar characters in the portion of the first input received from the user and the second input received from the user.

9. The method of claim 1, wherein determining whether the portion of the first input received from the user and the second input received from the user are phonetically similar includes detecting similar phonetic variations in the portion of the first input received from the user and the second input received from the user.

10. A system for selecting and presenting content items based on user input, the system comprising:
   computer readable instructions encoded on a non-transitory computer readable medium, the computer readable instructions causing the computer system to be configured to:
      provide access to a set of content items, the set of content items associated with metadata that describes a corresponding content item;
      sequentially receive a first input from the user and a second input from the user, wherein the first input comprises one or more complete words and the second input comprises one or more complete words, wherein the second input is received without an intervening input between the second input and the first input;
      determine whether at least a portion of the first input received from the user and at least a portion of the second input received from the user are phonetically similar, wherein the portion of the first input comprises at least one complete word and the portion of the second input comprises at least one complete word;
      inferring an intent to alter the first input based on determining that the at least a portion of the first input received from the user is phonetically similar to the at least a portion of the second input received from the user;
      based on inferring the intent to alter the first input, determine an alternative query input by replacing a portion of the first input received from the user with a portion of the second input received from the user;
      based on determining that the at least a portion of the first input received from the user is not phonetically similar to the at least a portion of the second input received from the user, determine the alternative query input by combining the first input received from the user and the second input received from the user;
      perform a search using the alternative query to select a subset of content items from the set of content items by comparing the alternative query input with the metadata associated with the subset of content items; and
      present the subset of content items to the user.

11. The system of claim 10, further comprising computer readable instructions causing the computer system to be configured to determine that the first input received from the user is a request for one or more content items.

12. The system of claim 10, further comprising computer readable instructions causing the computer system to be configured to provide feedback to the user identifying a portion of the first input received from the user.

13. The system of claim 10, further comprising computer readable instructions causing the computer system to be configured to:
   determine that the portion of the first input received from the user is important, and in response to the determining that the portion of the first input received from the user is important, provide feedback to the user identifying the portion of the first input received from the user.

14. The system of claim 10, wherein the selection of the subset of content items is based further upon a disfluency identified in the first input received from the user, and based further upon prior conversational interactions that are determined to be related to the first input received from the user and the second input received from the user.

15. The system of claim 10, wherein the computer-readable instructions causing the system to be configured to provide the feedback includes at least one of:
   computer-readable instructions causing the system to be configured to request clarification on the identified portion of the first input received from the user,
   computer-readable instructions causing the system to be configured to suggest a completion of the received first input received from the user, and
computer-readable instructions causing the system to be configured to repeat the portion of the first input received from the user to the user, so as to notify the user that the portion of the first input received from the user is potentially incorrectly recognized.

16. The system of claim 10, wherein the computer-readable instructions causing the system to be configured to present the subset of content items includes computer-readable instructions causing the system to be configured to present the subset of content items before receiving completed input from the user, upon a determination of a strong recognition match for the first input received from the user and upon a determination that a responsiveness measure of the selected subset of content items would be sufficient.

17. The system of claim 10, wherein the computer readable instructions cause the computer system, when determining whether the portion of the first input received from the user and the second input received from the user are phonetically similar, to determine whether the portion of the first input received from the user and the second input received from the user are phonetically similar by detecting similar characters in the portion of the first input received from the user and the second input received from the user.

18. The system of claim 10, wherein the computer readable instructions cause the computer system, when determining whether the portion of the first input received from the user and the second input received from the user are phonetically similar, to determine whether the portion of the first input received from the user and the second input received from the user are phonetically similar by detecting similar phonetic variations in the portion of the first input received from the user and the second input received from the user.

19. The system of claim 10, wherein the at least a portion of the first input received from the user is not identical to the at least a portion of the second input received from the user.

20. The method of claim 1, wherein the at least a portion of the first input received from the user is not identical to the at least a portion of the second input received from the user.

* * * * *